(12) United States Patent
Yamaguchi et al.

(10) Patent No.: US 10,121,591 B2
(45) Date of Patent: Nov. 6, 2018

(54) LAMINATED CERAMIC CAPACITOR AND METHOD FOR MANUFACTURING LAMINATED CERAMIC CAPACITOR

(71) Applicant: Murata Manufacturing Co., Ltd., Nagaokakyo-shi, Kyoto-fu (JP)

(72) Inventors: Shinichi Yamaguchi, Nagaokakyo (JP); Shoichiro Suzuki, Nagaokakyo (JP); Akitaka Doi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/643,826

(22) Filed: Jul. 7, 2017

(65) Prior Publication Data

US 2017/0309400 A1    Oct. 26, 2017

Related U.S. Application Data

(60) Division of application No. 14/614,476, filed on Feb. 5, 2015, now Pat. No. 9,728,333, which is a (Continued)

(30) Foreign Application Priority Data

Aug. 7, 2012  (JP) .................... 2012-175048

(51) Int. Cl.
*H01G 4/008* (2006.01)
*H01G 4/30* (2006.01)
(Continued)

(52) U.S. Cl.
CPC ............ *H01G 4/008* (2013.01); *H01G 4/0085* (2013.01); *H01G 4/012* (2013.01); *H01G 4/12* (2013.01); *H01G 4/30* (2013.01); *H01G 13/00* (2013.01)

(58) Field of Classification Search
CPC .......... H01G 4/008; H01G 4/012; H01G 4/30; H01G 4/0085; H01G 4/12
See application file for complete search history.

(56) References Cited

U.S. PATENT DOCUMENTS 5,311,651 A    5/1994  Kim
5,319,517 A    6/1994  Nomura
(Continued)

FOREIGN PATENT DOCUMENTS

JP    03-200310    9/1991
JP    11-283867    10/1999
(Continued)

OTHER PUBLICATIONS

PCT/JP2013/063949 Copy of ISR dated Jul. 6, 2013.
PCT/JP2013/063949 Copy of Written Opinion dated Jul. 6, 2013.

*Primary Examiner* — David M Sinclair
(74) *Attorney, Agent, or Firm* — Arent Fox LLP

(57) ABSTRACT

A laminated ceramic capacitor that includes a ceramic laminated body having a stacked plurality of ceramic dielectric layers and a plurality of internal electrodes opposed to each other with the ceramic dielectric layers interposed therebetween, and external electrodes on the outer surface of the ceramic laminated body and electrically connected to the internal electrodes. The internal electrodes contain Ni and Sn, a proportion of the Sn/(Ni+Sn) ratio is 0.001 or more in molar ratio is 75% or more in a region of the internal electrode at a depth of 20 nm from a surface opposed to the ceramic dielectric layer, and the proportion of the Sn/(Ni+Sn) ratio is 0.001 or more in molar ratio is less than 40% in a central region in a thickness direction of the internal electrode.

1 Claim, 4 Drawing Sheets

Related U.S. Application Data continuation of application No. PCT/JP2013/063949, filed on May 20, 2013.

(51) Int. Cl.
  *H01G 4/12* (2006.01)
  *H01G 4/012* (2006.01)
  *H01G 13/00* (2013.01)

(56) References Cited

U.S. PATENT DOCUMENTS

| | | | |
|---|---|---|---|
| 6,631,070 B2 | 10/2003 | Schmidt | |
| 6,649,553 B2 | 11/2003 | Sugimoto | |
| 6,917,513 B1 | 7/2005 | Kim et al. | |
| 7,020,941 B2 | 4/2006 | Chazono | |
| 7,199,590 B2 | 4/2007 | Ito | |
| 9,099,244 B2 * | 8/2015 | Suzuki | H01G 4/008 |
| 2001/0021096 A1 | 9/2001 | Shizuno | |
| 2004/0256603 A1 * | 12/2004 | Celik | C22C 1/04 |
| | | | 252/500 |
| 2005/0102808 A1 | 5/2005 | Hirata | |
| 2006/0208575 A1 * | 9/2006 | Orimo | H01G 4/0085 |
| | | | 307/109 |
| 2007/0074806 A1 * | 4/2007 | Kojima | C04B 35/4682 |
| | | | 156/89.16 |
| 2009/0207551 A1 * | 8/2009 | Suzuki | C01G 23/002 |
| | | | 361/301.4 |
| 2013/0321980 A1 | 12/2013 | Suzuki | |
| 2015/0155098 A1 | 6/2015 | Yamaguchi | |

FOREIGN PATENT DOCUMENTS

| | | |
|---|---|---|
| JP | 2000-348962 A | 12/2000 |
| JP | 2005-298315 A | 10/2005 |
| WO | WO 2012/111592 A1 | 8/2012 |

* cited by examiner

US 10,121,591 B2

LAMINATED CERAMIC CAPACITOR AND METHOD FOR MANUFACTURING LAMINATED CERAMIC CAPACITOR

CROSS REFERENCE TO RELATED APPLICATIONS

The present application is a divisional of application Ser. No. 14/614,476, filed Feb. 5, 2015, which is a continuation of International application No. PCT/JP2013/063949, filed May 20, 2013, which claims priority to Japanese Patent Application No. 2012-175048, filed Aug. 7, 2012, the entire contents of each of which are incorporated herein by reference.

FIELD OF THE INVENTION

The present invention relates to a laminated ceramic capacitor, and a method for manufacturing a laminated ceramic capacitor.

BACKGROUND OF THE INVENTION

With the progress of recent electronics technology, the reduction in size and the increase in capacitance have been required for laminated ceramic capacitors. In order to satisfy these requirements, the reduction in layer thickness has been advanced for ceramic dielectric layers constituting laminated ceramic capacitors. However, the reduction of the ceramic dielectric layers in layer thickness relatively increases the electric field intensity applied per layer. Therefore, improved durability and reliability at the time of voltage application are required.

As the laminated ceramic capacitors, for example, a laminated ceramic capacitor is known which includes: a laminated body including a plurality of ceramic dielectric layers stacked and a plurality of internal electrodes formed along the interfaces between the ceramic dielectric layers; and a plurality of external electrodes formed on the outer surface of the laminated body and electrically connected to the internal electrodes (see Patent Document 1). Further, in the case of the laminated ceramic capacitor in Patent Document 1, electrodes which use Ni as their main constituent are disclosed as the internal electrodes.

Patent Document 1: Japanese Patent Application Laid-Open No. 11-283867

SUMMARY OF THE INVENTION

However, the laminated ceramic capacitor including the internal electrodes using Ni as a main constituent in Patent Document 1 has the problem of still insufficient durability in the case of high-voltage application for meeting the recent requirements of reduction in size and increase in capacitance.

The present invention has been achieved in order to solve the problem mentioned above, and an object of the present invention is to provide a laminated ceramic capacitor which exhibits excellent durability and favorable dielectric characteristics even when a voltage with a high electric field intensity is applied with ceramic dielectric layers further reduced in layer thickness.

In order to solve the problem mentioned above, a laminated ceramic capacitor according to the present invention is:

a laminated ceramic capacitor including: a ceramic laminated body having a plurality of stacked ceramic dielectric layers and a plurality of internal electrodes opposed to each other with the ceramic dielectric layers interposed therebetween; and an external electrode provided on the outer surface of the ceramic laminated body and electrically connected to the internal electrodes, and characterized in that:

the internal electrodes contain Ni and Sn;

the proportion of a region where the Sn/(Ni+Sn) ratio (the ratio of Sn to the total amount of Sn and Ni) is 0.001 or more in terms of molar ratio is 75% or more in a region of the internal electrode at a depth of 20 nm from a surface of the internal electrode opposed to the ceramic dielectric layer; and the proportion of a region where the Sn/(Ni+Sn) ratio (the ratio of Sn to the total amount of Sn and Ni) is 0.001 or more in terms of molar ratio is less than 40% in a central region in the thickness direction of the internal electrode.

Furthermore, a method for manufacturing a laminated ceramic capacitor according to the present invention is:

a method for manufacturing a laminated ceramic capacitor including: a ceramic laminated body of a plurality of stacked ceramic dielectric layers and a plurality of internal electrodes opposed to each other with the ceramic dielectric layers interposed therebetween; and an external electrode provided on the outer surface of the ceramic laminated body and electrically connected to the internal electrodes, where the internal electrodes contain Ni and Sn, the proportion of a region where the Sn/(Ni+Sn) ratio (the ratio of Sn to the total amount of Sn and Ni) is 0.001 or more in terms of molar ratio is 75% or more in a region of the internal electrode at a depth of 20 nm from a surface of the internal electrode opposed to the ceramic dielectric layer, and the proportion of a region where the Sn/(Ni+Sn) ratio (the ratio of Sn to the total amount of Sn and Ni) is 0.001 or more in terms of molar ratio is less than 40% in a central region in the thickness direction of the internal electrode, and characterized in that the method includes the steps of:

forming an unfired ceramic laminated body including a plurality of unfired ceramic dielectric layers stacked to serve as the ceramic dielectric layers after being subjected to firing and a plurality of unfired internal electrode patterns formed by applying a conductive paste and provided along the plurality of interfaces between the unfired ceramic dielectric layers; and firing the unfired ceramic laminated body to obtain the ceramic laminated body, and used as the conductive paste is a conductive paste containing a Sn constituent blended common material with a Sn constituent blended in a ceramic material powder that has the same or substantially the same composition as that of a ceramic material powder constituting the unfired ceramic dielectric layers.

It is to be noted that the Sn constituent blended common material contained in the conductive paste in the present invention refers to a broad concept that means a material that has a Sn compound such as, for example, $SnO_2$ blended in a material such as the same ceramic material powder as the ceramic material powder (the ceramic material powder for dielectric layers) constituting the unfired ceramic dielectric layers, or a ceramic material powder that has the same composition as that of the ceramic material powder for dielectric layers, or furthermore, a ceramic material powder that has a composition similar to that of the ceramic material powder for dielectric layers.

Furthermore, another laminated ceramic capacitor according to the present invention is:

a laminated ceramic capacitor including: a ceramic laminated body having a plurality of stacked ceramic dielectric layers and a plurality of internal electrodes opposed to each other with the ceramic dielectric layers interposed therebetween; and an external electrode provided on the outer surface of the ceramic laminated body and electrically connected to the internal electrodes, and characterized in that:

the internal electrodes contain Ni and Sn, and have a solid solution of Sn in Ni;

the proportion of Sn to the total amount of Sn and Ni is 2 atomic % or more in a region of the internal electrode at a depth of 2 nm from the interface between the internal electrode and the ceramic dielectric layer; and the proportion of Sn to the total amount of Sn and Ni in a region of the internal electrode at a depth of 2 nm from the interface between the internal electrode and the ceramic dielectric layer is higher than the proportion of Sn in a region of the internal electrode at a depth of 20 nm or more from the interface between the internal electrode and the ceramic dielectric layer by 1.0 atomic % or more.

Furthermore, another method for manufacturing a laminated ceramic capacitor according to the present invention is:

a method for manufacturing a laminated ceramic capacitor including: a ceramic laminated body having a plurality of stacked ceramic dielectric layers and a plurality of internal electrodes opposed to each other with the ceramic dielectric layers interposed therebetween; and an external electrode provided on the outer surface of the ceramic laminated body and electrically connected to the internal electrodes, where the internal electrodes contain Ni and Sn, and have a solid solution of Sn in Ni, and characterized in that the method includes the steps of:

forming an unfired ceramic laminated body including a plurality of unfired ceramic dielectric layers stacked to serve as the ceramic dielectric layers after being subjected to firing and a plurality of unfired internal electrode patterns formed by applying a conductive paste and provided along the plurality of interfaces between the unfired ceramic dielectric layers; and firing the unfired ceramic laminated body to obtain the ceramic laminated body, used as the conductive paste is a conductive paste containing a Sn constituent blended common material with a Sn constituent blended in a ceramic material powder that has a composition containing at least some of elements constituting a ceramic material powder constituting the unfired ceramic dielectric layers, and firing the unfired ceramic laminated body provides the ceramic laminated body in which the proportion of Sn to the total amount of Sn and Ni is 2 atomic % or more in a region of the internal electrode constituting the ceramic laminated body at a depth of 2 nm from the interface between the internal electrode and the ceramic dielectric layer, and the proportion of Sn to the total amount of Sn and Ni in a region of the internal electrode at a depth of 2 nm from the interface between the internal electrode and the ceramic dielectric layer is higher than the proportion of Sn in a region of the internal electrode at a depth of 20 nm or more from the interface between the internal electrode and the ceramic dielectric layer by 1.0 atomic % or more.

The laminated ceramic capacitor according to the present invention has the internal electrodes containing Ni and Sn, and meets the requirements that: the proportion of a region where the Sn/(Ni+Sn) ratio is 0.001 or more in terms of molar ratio is 75% or more in a region (near-interface region) of the internal electrode at a depth of 20 nm from the surface opposed to the ceramic dielectric layer; and the proportion of a region where the Sn/(Ni+Sn) ratio is 0.001 or more in terms of molar ratio is less than 40% in a central region (inner electrode region) in the thickness direction of the internal electrode, thus making it possible to achieve high electrostatic capacitance, and making it possible to achieve a highly reliable laminated ceramic capacitor which has excellent high-temperature load life.

More particularly, in the present invention, it is believed that the formation of the Ni—Sn alloy in the internal electrodes changes the condition of the interface between the ceramic dielectric layer and the internal electrode, which makes a contribution to the improvement in high-temperature load life. In particular, the presence of a lot of Ni—Sn alloy in the near-interface region of the internal electrode between the electrode and the ceramic dielectric layer is assumed to have an important part for the improvement in high-temperature load life.

On the other hand, there is not necessarily a need for the presence of a lot of Ni—Sn alloy in the central region (inner electrode region) in the thickness direction of the internal electrode, because the central region makes no particular contribution to the improvement in high-temperature load life.

It is to be noted that while the reason that high electrostatic capacitance is achieved by the presence of a higher rate of Sn in the near-interface region of the internal electrode than in the inner electrode region has not been necessarily defined, but assumed to be due to the fact that the difference in the proportion of Sn presence between the near-interface region and inner electrode region of the internal electrode (the presence of a higher rate of Sn in the near-interface region than in the inner electrode region) would produce a difference in lattice constant in a crystal lattice between the near-interface region and the inner electrode region, and change the distribution of residual stress within the laminated ceramic capacitor.

Furthermore, the method for manufacturing a laminated ceramic capacitor according to the present invention includes the steps of:

forming an unfired ceramic laminated body including a plurality of unfired ceramic dielectric layers and a plurality of unfired internal electrode patterns formed by applying a conductive paste and provided along the plurality of interfaces between the unfired ceramic dielectric layers; and firing the unfired ceramic laminated body to obtain the ceramic laminated body, and uses, as the conductive paste, a conductive paste containing a Sn constituent blended common material with a Sn constituent blended in a ceramic material powder that has the same or substantially the same composition as that of the ceramic material powder constituting the unfired ceramic dielectric layers, thus making it possible to manufacture, with certainty, a highly reliable laminated ceramic capacitor which is configured so that the proportion of a region where the Sn/(Ni+Sn) ratio is 0.001 or more in terms of molar ratio is 75% or more in a region (near-interface region) of the internal electrode at a depth of 20 nm from the surface opposed to the ceramic dielectric layer, whereas the proportion of a region where the Sn/(Ni+Sn) ratio is 0.001 or more in terms of molar ratio is less than 40% in a central region (inner electrode region) in the thickness direction of the internal electrode, that is, a higher rate of Sn is present in the near-interface region of the internal electrode than in the inner electrode region, capable of achieving high electrostatic capacitance, and excellent in high-temperature load life.

In the method for manufacturing a laminated ceramic capacitor according to the present invention, the conductive paste containing the Sn constituent blended common material with the Sn constituent blended in a ceramic material powder that has the same or substantially the same composition as that of the ceramic material powder constituting the unfired ceramic dielectric layers is used as the conductive paste as the conductive paste as described above. Thus, in the firing step, the common material (Sn constituent blended common material) is pulled to the high-affinity ceramic dielectric layer side, and the Sn constituent blended in the common material is also pulled to the ceramic dielectric layer side. As a result, it becomes possible to manufacture, with certainty, and moreover with great efficiency, a laminated ceramic capacitor which has the distinctive feature of a higher rate of Sn present in the interface (near-interface region) between the internal electrode and the ceramic dielectric layer than in the internal part (inner electrode region) of the internal electrode.

Furthermore, the laminated ceramic capacitor according to another aspect of the present invention is configured so that the internal electrodes contain Ni and Sn, and have a solid solution of Sn in Ni, the proportion of Sn to the total amount of Sn and Ni is 2 atomic % or more in a region of the internal electrode at a depth of 2 nm from the interface between the internal electrode and the ceramic dielectric layer; and the proportion of Sn to the total amount of Sn and Ni in a region of the internal electrode at a depth of 2 nm from the interface between the internal electrode and the ceramic dielectric layer is higher than the proportion of Sn in a region of the internal electrode at a depth of 20 nm or more from the interface between the internal electrode and the ceramic dielectric layer by 1.0 atomic % or more, thus making it possible to achieve high electrostatic capacitance, and to provide a highly reliable laminated ceramic capacitor which is excellent in high-temperature load life.

In the laminated ceramic capacitor according to another aspect of the present invention, the formation of the Ni—Sn alloy in the internal electrodes and the Sn proportion which meets the requirements mentioned above are believed to change the condition of the interface between the ceramic dielectric layer and the internal electrode, thereby providing an improvement in high-temperature load life. In particular, the presence of a lot of Ni—Sn alloy in the region of the internal electrode at a depth of 2 nm from the interface between the internal electrode and the ceramic dielectric layer is assumed to have an important part for the improvement in high-temperature load life.

On the other hand, there is not necessarily a need for the presence of a lot of Ni—Sn alloy in the region of the internal electrode at a depth of 20 nm or more from the interface between the internal electrode and the ceramic dielectric layer, because the region makes no particular contribution to the improvement in high-temperature load life.

Furthermore, in the method for manufacturing a laminated ceramic capacitor according to the present invention, the conductive paste containing the Sn constituent blended common material with the Sn constituent blended in a ceramic material powder that has a composition containing at least some of the elements constituting a ceramic material powder constituting the unfired ceramic dielectric layers is used as the conductive paste as described above, firing the unfired ceramic laminated body provides the ceramic laminated body in which the proportion of Sn to the total amount of Sn and Ni is 2 atomic % or more in a region of the internal electrode constituting the ceramic laminated body at a depth of 2 nm from the interface between the internal electrode and the ceramic dielectric layer, and the proportion of Sn to the total amount of Sn and Ni in a region of the internal electrode at a depth of 2 nm from the interface between the internal electrode and the ceramic dielectric layer is higher than the proportion of Sn in a region of the internal electrode at a depth of 20 nm or more from the interface between the internal electrode and the ceramic dielectric layer by 1.0 atomic % or more, and in the firing step, the common material (Sn constituent blended common material) is pulled to the high-affinity ceramic dielectric layer side, and the Sn constituent blended in the common material is also pulled to the ceramic dielectric layer side, thus making it possible to achieve, with certainty, a ceramic laminated body in which the proportion of Sn is 2 atomic % or more in a region of the internal electrode at a depth of 2 nm from the interface between the internal electrode and the ceramic dielectric layer, and the proportion of Sn in the region at a depth of 2 nm from the interface is higher than the proportion of Sn in a region of the internal electrode at a depth of 20 nm or more from the interface by 1.0 atomic % or more, to achieve high electrostatic capacitance, and to manufacture, with great efficiency, a highly reliable laminated ceramic capacitor which is excellent in high-temperature load life.

DETAILED DESCRIPTION OF THE INVENTION

With reference to embodiments of the present invention, features of the present invention will be described below in details.

Embodiment 1

Figure 1:
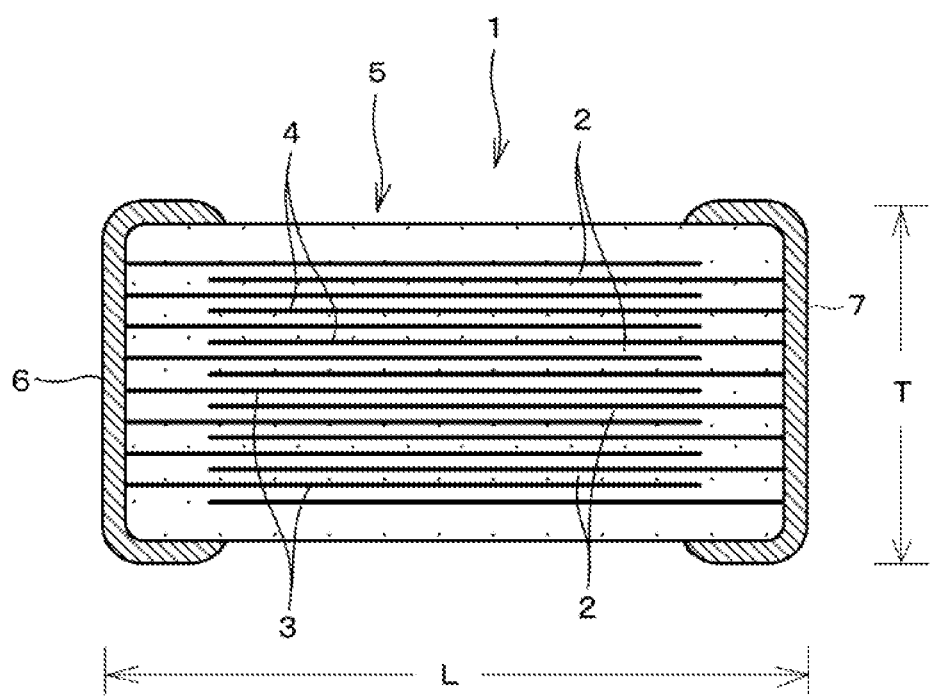
FIG. 1 is a front cross-sectional view illustrating the configuration of a laminated ceramic capacitor according to an embodiment of the present invention.

<Configuration of Laminated Ceramic Capacitor>
FIG. 1 is a front cross-sectional view illustrating the configuration of a laminated ceramic capacitor according to an embodiment (Embodiment 1) of the present invention.

This laminated ceramic capacitor 1 includes a ceramic laminated body 5. The ceramic laminated body 5 includes a plurality of ceramic dielectric layers 2 stacked, and a plurality of internal electrodes 3 and 4 provided therein to be opposed to each other with the ceramic dielectric layers 2 interposed therebetween. It is to be noted that the internal electrodes 3 and 4 provided in the ceramic dielectric layers 2 are alternately extracted to opposite end surfaces of the ceramic laminated body 5.

Further, on the end surfaces of the ceramic laminated body 5, which are opposed to each other, external electrodes 6 and 7 are provided so as to be electrically connected to the internal electrodes 3 and 4.

The external electrodes 6 and 7 are formed on the end surfaces opposed to each other on the outer surface of the ceramic laminated body 5. Further, the external electrodes 6 and 7 are connected to the internal electrodes 3 and 4, respectively, alternately extracted to the opposite end surfaces.

It is to be noted that materials containing, for example, Ag or Cu as their main constituent can be used as the conductive material constituting the external electrodes 6 and 7.

It is to be noted that while this laminated ceramic capacitor 1 according to Embodiment 1 is a two-terminal type capacitor including the two external electrodes 6 and 7, the present invention can be also applied to multi-terminal type capacitors including a number of external electrodes.

In this laminated ceramic capacitor 1, the internal electrodes 3 and 4 contain Ni as their main constituent, and contain Sn.

Furthermore, the internal electrodes 3 and 4 are each composed so that the proportion of a region where the Sn/(Ni+Sn) ratio that is the ratio of Sn to the total amount of Sn and Ni is 0.001 or more in terms of molar ratio is 75% or more in a region (near-interface region) at a depth of 20 nm from a surface of the electrode opposed to the ceramic dielectric layer 2.

Furthermore, the internal electrodes 3 and 4 are each composed of so that the proportion of a region where the Sn/(Ni+Sn) ratio that is the ratio of Sn to the total amount of Sn and Ni is 0.001 or more in terms of molar ratio is less than 40% in a central region (inner electrode region) in the thickness direction of the electrode.

This composition makes it possible to achieve high electrostatic capacitance, and makes it possible achieve the highly reliable laminated ceramic capacitor 1 which has an excellent high-temperature load life.

<Manufacture of Laminated Ceramic Capacitor>

Next, a method for manufacturing the laminated ceramic capacitor 1 according to the above-described embodiment (Embodiment 1) of the present invention will be described.

(1) First, predetermined amounts of $BaCO_3$ powder and $TiO_2$ powder were weighed as raw materials for a perovskite-type compound containing Ti and Ba. Then, the weighed powders were combined, mixed with a ball mill, and then subjected to heat treatment under a predetermined condition to obtain a barium titanate-based perovskite-type compound powder to serve as a main constituent of the material constituting the ceramic dielectric layers.

(2) Next, respective powders of $Dy_2O_3$, MgO, MnO, and $SiO_2$ were prepared as accessory constituents, and weighed so that the $Dy_2O_3$, MgO, MnO, and $SiO_2$ were 0.75 parts by mol, 1 part by mol, 0.2 parts by mol, and 1 part by mol, respectively, with respect to 100 parts by mol of the main constituent described above. These powders were blended with the barium titanate-based perovskite-type compound powder as a main constituent, mixed with a ball mill for a given length of time, dried, and then subjected to dry grinding to obtain a raw material powder.

(3) Next, this raw material powder with a polyvinyl butyral-based binder and an organic solvent such as ethanol added thereto was mixed in a wet way with a ball mill to adjust slurry. This ceramic slurry was subjected to sheet forming in accordance with a doctor blade method, thereby providing ceramic green sheets of 2.8 μm in thickness.

(4) Next, a conductive paste for the formation of internal electrodes was prepared by the following method.

First, a common material (Sn constituent blended common material) was prepared for blending into the conductive paste for the formation of internal electrodes. For the preparation of the Sn constituent blended common material, a barium titanate ($BaTiO_3$) powder with a surface area of 35 $m^2/g$ and a $SnO_2$ powder were prepared, and blended so that the amount of Sn with respect to the barium titanate ($BaTiO_3$) accounted for the proportion as shown in Table 1, mixed in a wet way with a ball mill, and then subjected to grinding. Then, the obtained slurry was subjected to evaporative drying, and thereafter to dry grinding to obtain a Sn constituent blended common material for blending into the conductive paste for the formation of internal electrodes.

It is to be noted that the "Proportion of Sn with respect to Barium Titanate in Common Material" in Table 1 refers to a value indicating the proportion of the amount (molar quantity) of Sn with respect to the amount (molar quantity) of $BaTiO_3$ in the common material, which is a value obtained from the following formula:

Proportion of Sn={Sn(molar quantity)/$BaTiO_3$(molar quantity)}×100.

In addition, a Ni powder and a Ni—Sn alloy powder (Ni:Sn=99:1) were prepared as conductive powders.

Then, the Sn constituent blended common material, the Ni powder, and the Ni—Sn alloy powder were weighed so that the ratios by weight of the Sn constituent blended common material to the Ni powder or to the Ni—Sn alloy powder corresponded with the ratios by weight as shown in Table 1.

Then, the powders with a polyvinyl butyral-based binder and an organic solvent such as ethanol added thereto were mixed in a wet way with a ball mill to obtain a conductive paste for the formation of internal electrodes.

It is to be noted that the "Proportion of Common Material to Ni" in Table 1 refers to a value indicating the proportion of the common material in terms of parts by weight with respect to 100 parts by weight of Ni in the conductive paste for the formation of internal electrodes, which is a value obtained from the following formula:

Proportion of Common Material to Ni={Common Material(parts by weight)/Ni parts by weight}× 100.

(5) Next, this conductive paste was printed in a predetermined pattern onto the ceramic green sheets prepared in the way described above to form conductive paste layers (internal electrode patterns) to serve as internal electrodes after being subjected to firing.

(6) Then, a plurality of ceramic green sheets were stacked so that the internal electrode patterns described above were alternately extracted to the opposite sides, thereby providing an unfired ceramic laminated body.

(7) This ceramic laminated body was heated to 350° C. in a $N_2$ atmosphere to burn the binder, and subjected to firing at 1200° C. for 20 minutes after increasing the temperature at a rate of temperature increase of 20° C./min in a reducing atmosphere of $H_2$—$N_2$—$H_2O$ gas with an oxygen partial pressure of $10^{-10}$ to $10^{-12}$ MPa, thereby obtaining a fired ceramic laminated body.

(8) Next, a conductive paste for the formation of external electrodes, containing Ag as a conductive component and containing a $B_2O_3$—$SiO_2$—BaO-based glass frit, was applied to both end surfaces of the obtained ceramic laminated body, baked at a temperature of 600° C. in a $N_2$ atmosphere to form external electrodes electrically connected to internal electrodes. In this way, laminated ceramic capacitors (samples of sample numbers 1 to 9 in Table 1) 1 structured as shown in FIG. 1 were obtained.

It is to be noted that the samples of sample numbers 4 to 9 marked with * in Table 1 are samples according to comparative examples, which fail to meet the requirements of the present invention, whereas the samples of sample numbers 1 to 3 marked with no * in Table 1 are samples according to examples, which meet the requirements of the present invention.

It is to be noted that the outside dimensions of the laminated ceramic capacitors obtained in Embodiment 1 were: width (W): 1.2 mm; length (L): 2.0 mm; and thickness (T): 1.1 mm, and the ceramic dielectric layer interposed between the internal electrodes was 2.2 µm in thickness. In addition, the total number of effective ceramic dielectric layers interposed between the internal electrodes was 300, and the area of the electrode opposed per layer was $1.6 \times 10^{-6}$ m$^2$.

<Evaluation of Characteristics>

For each of the laminated ceramic capacitors (samples of sample numbers 1 to 9 in Table 1) prepared in the way described above, electrostatic capacitance measurement, a high-temperature load test, etc. were carried out by the methods described below to examine characteristics.

(1) Measurement of Electrostatic Capacitance

First, from the prepared samples (laminated ceramic capacitors) of sample numbers 1 to 9 in Table 1, ten pieces of samples were taken for each sample number.

Next, an automatic bridge-type measurement instrument was used to measure the electrostatic capacitance under the condition of AC voltage: 1 Vrms at 1 kHz.

The results are shown together in Table 1.

(2) High-Temperature Load Test

The samples subjected to the electrostatic capacitance measurement were further subjected to a high-temperature load test under the condition of 7.5 V at 165° C., and a failure was determined at the time of an insulation resistance down to 10 KΩ or less. From this failure period, the MTTF (mean time to failure) was calculated.

The results are shown together in Table 1.

(3) Confirmation of Presence and Distribution of Sn in Internal Electrode

Furthermore, the fired ceramic laminated body obtained in the step (7) mentioned above for manufacturing the laminated ceramic capacitor was used to confirm the presence of Sn in the internal electrodes, the Sn alloyed with Ni, and the distribution of Sn in the internal electrodes by the method described below.

(3-1) Confirmation of Sn in Internal Electrode (a) Polishing

Each sample was held in such a posture as the length (L) direction in a vertical direction, the sample was encased in resin, and the WT surface defined by the width (W) and thickness (T) of the sample was exposed from the resin.

Then, the WT surfaces of the respective samples were polished by a polishing machine, and polished to a depth on the order of ½ in the length (L) directions of the respective samples. Then, in order to eliminate shear drop of the internal electrodes, which is caused by the polishing, the polished surfaces were processed by ion milling after the completion of the polishing.

(b) Mapping Analysis of Internal Electrode

Figure 2:
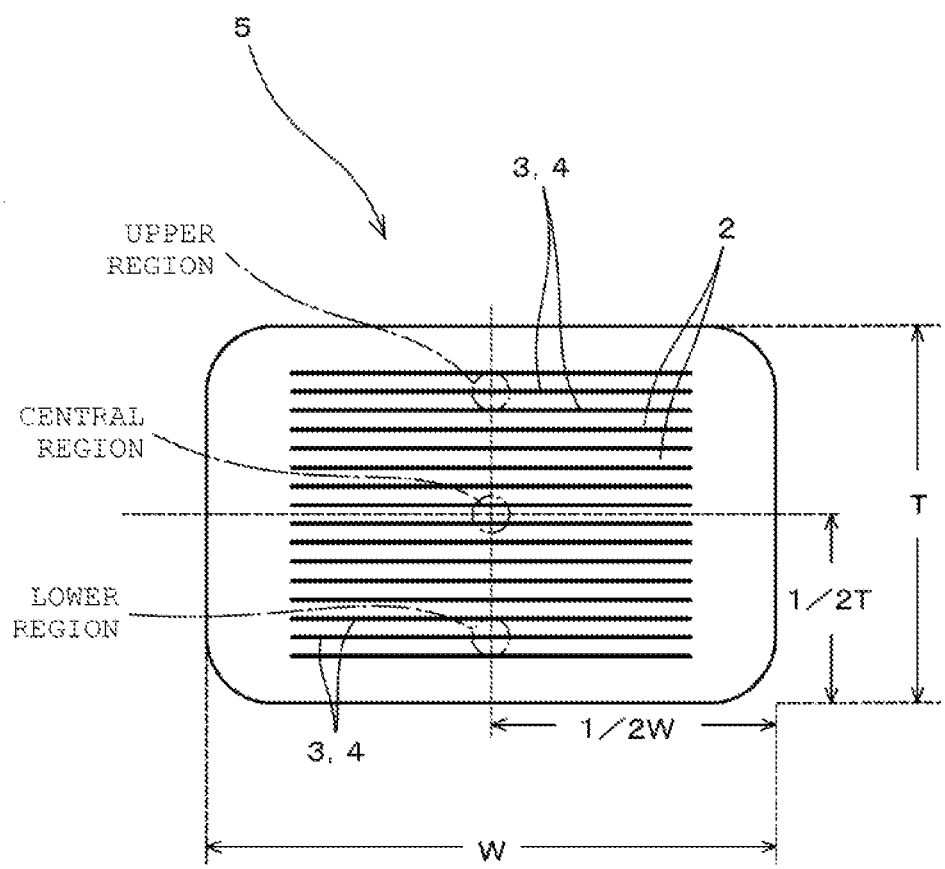
FIG. 2 is an explanatory diagram illustrating points for Ni and Sn mapping analyses performed by WDX on internal electrodes constituting the laminated ceramic capacitor according to the embodiment of the present invention.

Then, as shown in FIG. 2, in a region of a WT cross section with the internal electrodes stacked, in a position on the order of ½ in the L direction, three regions of: a central region; and upper and lower regions closer to an outer layer section (ineffective section), that is, an upper region and a lower region were subjected to Ni and Sn mapping analyses by WDX (wavelength-dispersive X-ray spectroscopy).

Figure 3:
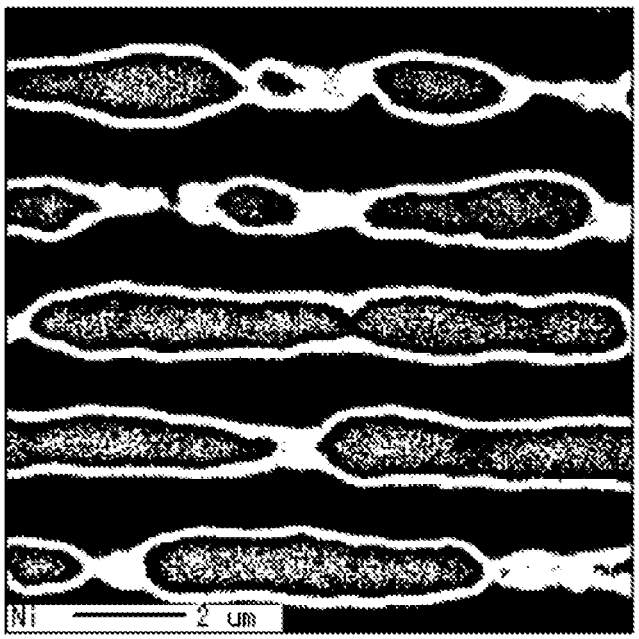
FIG. 3 is a diagram showing the result of Ni mapping analysis performed by WDX on the internal electrodes constituting the laminated ceramic capacitor according to the embodiment of the present invention.
Figure 4:
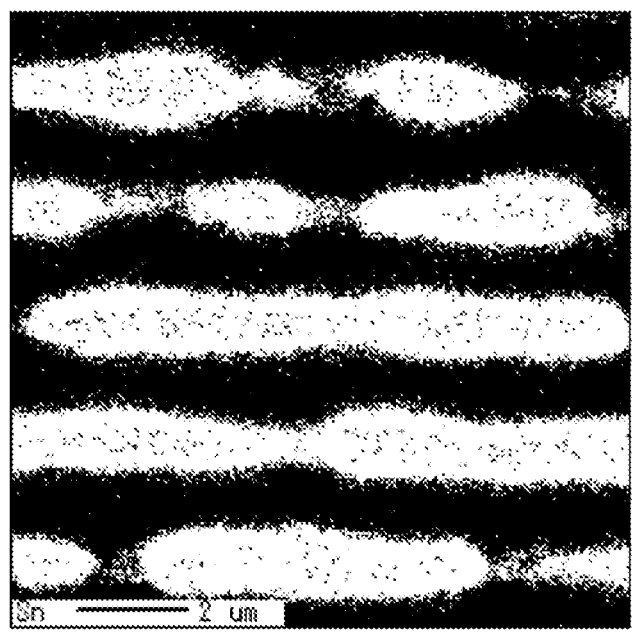
FIG. 4 is a diagram showing the result of Sn mapping analysis performed by WDX on the internal electrodes constituting the laminated ceramic capacitor according to the embodiment of the present invention.

FIGS. 3 and 4 show the results of the Ni and Sn mapping analyses, respectively, carried out for the samples of sample number 1 (the sample according to the example which meets the requirements of the present invention).

From FIGS. 3 and 4, it has been confirmed that there is Sn in the internal electrodes in the sample of sample number 1 (the laminated ceramic capacitor according to Embodiment 1 of the present invention) with the internal electrodes formed with the use of the conductive paste blended with the Sn constituent blended common material.

It is to be noted that it has been also confirmed that there is Sn in the internal electrodes as a result of the mapping analyses in each case of other samples (sample numbers 2 to 8) obtained by using the conductive pastes containing the Ni—Sn alloy powder a conductive component, and Ni powder as a conductive component and containing the common material blended with the Sn constituent ($SnO_2$), and the sample of sample number 9 obtained by using the conductive paste containing no common material blended with the Sn constituent ($SnO_2$).

(3-2) Confirmation of Form of Sn in Internal Electrode

The fired ceramic laminated body obtained in the step (7) described above for manufacturing the laminated ceramic capacitor was subjected to grinding into the form of a powder, and the obtained powder was analyzed by XRD (X-ray diffraction). As a result, the peak position of Ni was shifted, and thus, it has been confirmed that the Sn in the internal electrodes is present in the form of a Ni—Sn alloy.

(3-3) Confirmation of Distribution of Sn in Internal Electrode

The fired ceramic laminated body obtained in the step (7) described above for manufacturing the laminated ceramic capacitor was made into a thin piece by milling to prepare an analysis sample.

Then, this analysis sample was observed with a TEM (transmission electron microscope), and four internal electrodes were selected in a random manner from the analysis sample.

Then, in each internal electrode, five points were extracted in a random manner from each of: a region (hereinafter, referred to as a "near-interface region") at a depth of 20 nm from the surface of the internal electrode opposed to the ceramic dielectric layer; and a central region (hereinafter, referred to as an "inner electrode region") of the internal electrode in the thickness direction.

Next, for the above-described four internal electrodes selected in a random manner, quantitative analyses of Ni and Sn were performed by EDX (energy dispersive X-ray spectrometry) at the five points for each of the near-interface region and inner electrode region. For each sample, the number of pieces of data for each of the near-interface region and inner electrode region is: 4 (number of internal electrodes: 4)×5 (points for each of near-interface region and inner electrode region: 5 points)=20.

The ratio of Sn to the total amount of Sn and Ni: Sn/(Ni+Sn) ratio (molar ratio) was obtained from the average values of the analysis results.

Then, obtained were the proportion of a region with the Sn/(Ni+Sn) ratio of 0.001 or more in terms of molar ratio in the near-interface region of the internal electrode, and the proportion of a region with the Sn/(Ni+Sn) ratio of 0.001 or more in terms of molar ratio in the inner electrode region.

Table 1 shows the proportions of regions with the Sn/(Ni+Sn) ratio of 0.001 or more in terms of molar ratio in the near-interface region and the inner electrode region of the internal electrode for each sample together.

TABLE 1

| Sample Number | Conductive Powder constituting Internal Electrode Paste | Proportion of Sn to Barium Titanate in Common Material | Proportion of Common Material to Ni | Proportion of Region with Sn/(Ni + Sn) Ratio of 0.001 or more | | Electrostatic Capacitance (uF) | MTTF (hr) |
|---|---|---|---|---|---|---|---|
| | | | | Near-Interface Region (%) | Inner Electrode Region (%) | | |
| 1 | Ni | 20 | 5 | 85 | 20 | 5.68 | 108 |
| 2 | Ni | 20 | 7.5 | 90 | 30 | 5.57 | 102 |
| 3 | Ni | 15 | 7.5 | 75 | 25 | 5.52 | 104 |
| 4* | Ni | 10 | 7.5 | 70 | 30 | 5.57 | 72 |
| 5* | Ni | 5 | 7.5 | 45 | 30 | 5.51 | 67 |
| 6* | Ni | 10 | 10 | 70 | 45 | 5.12 | 68 |
| 7* | Ni | 10 | 12.5 | 70 | 55 | 5.08 | 73 |
| 8* | Ni | 20 | 10 | 85 | 40 | 5.12 | 97 |
| 9* | Ni—Sn Alloy | 0 | 5 | 90 | 90 | 5.13 | 103 |

As shown in Table 1, in the cases of the samples of sample numbers 1 to 3, which meet the requirements of the present invention: that the proportion of the region with the Sn/(Ni+Sn) ratio of 0.001 or more in terms of molar ratio is 75% or more in the near-interface region; and that the proportion of the region with the Sn/(Ni+Sn) ratio of 0.001 or more in terms of molar ratio is less than 40% in the inner electrode region, it has been determined that downsizing and high electrostatic capacitance are achieved with high capacitance obtained, and that excellent durability against the use under high temperature is achieved with a large value of the MTTF (mean time to failure) in the high-temperature load test.

On the other hand, in the cases of the samples of sample numbers 4 to 9, which fail to meet the requirements of the present invention: that the proportion of the region with the Sn/(Ni+Sn) ratio of 0.001 or more in terms of molar ratio is 75% or more in the near-interface region; and that the proportion of the region with the Sn/(Ni+Sn) ratio of 0.001 or more in terms of molar ratio is less than 40% in the inner electrode region, it has been determined that undesirable results are obtained in regard to either electrostatic capacitance acquired or durability in the high-temperature load test.

It is to be noted that in the case of the sample of sample number 9, which contains the Ni—Sn alloy powder as a conductive component, but uses the conductive paste containing no common material blended with the Sn constituent ($SnO_2$), it has been confirmed that a favorable result is obtained in regard to durability in the high-temperature load test, while the electrostatic capacitance obtained is lower as compared with the cases of the samples of sample numbers 1 to 3, which meet the requirements of the present invention.

From the results described above, it is determined that according to the present invention, a laminated ceramic capacitor is achieved which has high electrostatic capacitance obtained, and moreover, excellent durability with a large value of MTTF in a high-temperature load test.

It is to be noted that in the laminated ceramic capacitor according to the present invention, the reason why the electrostatic capacitance obtained is increased is believed that the Sn existence probability in the near-interface region of the internal electrode is made higher than that in the inner electrode region to produce a difference in lattice constant in a crystal lattice, and produce a change in distribution of residual stress within the laminated ceramic capacitor.

Furthermore, in the laminated ceramic capacitor according to the present invention, the reason why the durability in the high-temperature load test is improved is believed that the formation of the Ni—Sn alloy in the internal electrode changes the condition of the interface between the ceramic dielectric layer and the internal electrode. In particular, the presence of Ni—Sn alloy at the interface between the internal electrode and the ceramic dielectric layer is assumed to have an important part for the improvement in high-temperature load life.

Embodiment 2

Also in this Embodiment 2, a laminated ceramic capacitor configured in the same way as the laminated ceramic capacitor according to Embodiment 1 of the present invention was manufactured which was structured as shown in FIG. 1.

<Manufacture of Laminated Ceramic Capacitor>

Next, a method for manufacturing a laminated ceramic capacitor 1 according to Embodiment 2 of the present invention will be described.

(1) First, predetermined amounts of $BaCO_3$ powder and $TiO_2$ powder were weighed as raw materials for a perovskite-type compound containing Ti and Ba. Then, the weighed powders were combined, mixed for a given length of time with a ball mill, and then subjected to heat treatment under a predetermined condition to obtain a barium titanate-based perovskite-type compound powder to serve as a main constituent of the material constituting the ceramic dielectric layers.

(2) Next, respective powders of $Dy_2O_3$, MgO, MnO, and $SiO_2$ were prepared as accessory constituents, and weighed so that the $Dy_2O_3$, MgO, MnO, and $SiO_2$ were 0.75 parts by mol, 1 part by mol, 0.2 parts by mol, and 1 part by mol, respectively, with respect to 100 parts by mol of the main constituent described above. These powders were blended with the barium titanate-based perovskite-type compound powder as a main constituent, mixed with a ball mill for a given length of time, dried, and then subjected to dry grinding to obtain a raw material powder.

(3) Next, this raw material powder with a polyvinyl butyral-based binder and an organic solvent such as ethanol added thereto was mixed in a wet way with a ball mill to adjust slurry. This ceramic slurry was subjected to sheet forming in accordance with a doctor blade method, thereby providing ceramic green sheets of 2.8 μm in thickness.

(4) Next, a conductive paste for the formation of internal electrodes was prepared by the following method.

First, a common material (Sn constituent blended common material) was prepared for blending into the conductive paste for the formation of internal electrodes. For the preparation of the Sn constituent blended common material, a barium titanate ($BaTiO_3$) powder with a surface area of 35 $m^2/g$ and a $SnO_2$ powder were prepared, and the both powders were blended so that the amount of Sn with respect to the barium titanate ($BaTiO_3$) accounted for the proportion as shown in Table 2, mixed in a wet way with a ball mill, and then subjected to grinding. Then, the obtained slurry was subjected to evaporative drying, and thereafter to dry grinding to obtain a Sn constituent blended common material for blending into the conductive paste for the formation of internal electrodes.

It is to be noted that the "Proportion of Sn with respect to $BaTiO_3$ in Common Material" in Table 2 refers to a value indicating the proportion of the amount (molar quantity) of Sn with respect to the amount (molar quantity) of $BaTiO_3$ in the common material, which is a value obtained from the following formula:

Proportion of Sn={Sn(molar quantity)/$BaTiO_3$(molar quantity)}×100.

Furthermore, a Ni powder was prepared as a conductive powder, and the Sn constituent blended common material and the Ni powder were weighed so that the proportion of the Sn constituent blended common material (also referred to simply as a "common material") to the total amount of the Ni powder and above-described Sn constituent blended common material accounted for the proportion as shown in Table 2.

Then, the powders with a polyvinyl butyral-based binder and an organic solvent such as ethanol added thereto were mixed in a wet way with a ball mill to obtain a conductive paste for the formation of internal electrodes.

It is to be noted that the "Proportion of Common Material to Ni" in Table 2 refers to a value indicating the proportion of the Sn constituent blended common material in terms of parts by weight with respect to 100 parts by weight of Ni in the conductive paste for the formation of internal electrodes, which is a value obtained from the following formula:

Proportion of Common Material to Ni={Common Material(parts by weight)/Ni parts by weight}×100.

(5) Next, this conductive paste was printed in a predetermined pattern onto the ceramic green sheets prepared in the way described above to form conductive paste layers (internal electrode patterns) to serve as internal electrodes after being subjected to firing.

(6) Then, a plurality of ceramic green sheets were stacked so that the internal electrode patterns described above were alternately extracted to the opposite sides, thereby providing an unfired ceramic laminated body.

(7) This ceramic laminated body was heated to 350° C. in a $N_2$ atmosphere to burn the binder, and subjected to firing at 1200° C. for 20 minutes after increasing the temperature at a rate of temperature increase of 20° C./min in a reducing atmosphere of $H_2$—$N_2$—$H_2O$ gas with an oxygen partial pressure of $10^{-10}$ to $10^{-12}$ MPa, thereby obtaining a fired ceramic laminated body.

(8) Next, a conductive paste for the formation of external electrodes, containing Ag as a conductive component and containing a $B_2O_3$—$SiO_2$—BaO-based glass frit, was applied to both end surfaces of the obtained ceramic laminated body, baked at a temperature of 600° C. in a $N_2$ atmosphere to form external electrodes electrically connected to internal electrodes. In this way, laminated ceramic capacitors (samples of sample numbers 11 to 19 in Table 2) structured as shown in FIG. 1 were obtained. Note that the sample of sample number 19 has internal electrodes formed with the use of a conductive paste for the formation of internal electrodes, which contains a Ni—Sn alloy powder as a conductive component.

TABLE 2

| Sample Number | Conductive Powder constituting Internal Electrode Paste | Proportion of Sn to Barium Titanate in Common Material | Proportion of Common Material to Ni | Concentration of Sn with respect to Ni | | | Electrostatic Capacitance (uF) | MTTF (hr) |
| --- | --- | --- | --- | --- | --- | --- | --- | --- |
| | | | | Interfacial Concentration (atomic %) | Internal Concentration (atomic %) | Difference between Interfacial and Internal Sn Concentrations (atomic %) | | |
| 11 | Ni | 20 | 5 | 4.4 | 0.5 | 3.9 | 5.68 | 108 |
| 12 | Ni | 20 | 7.5 | 6.8 | 3.1 | 3.7 | 5.57 | 102 |
| 13 | Ni | 15 | 7.5 | 2.0 | 0.2 | 1.8 | 5.52 | 104 |
| 14* | Ni | 10 | 7.5 | 1.5 | 0.3 | 1.2 | 5.57 | 72 |
| 15* | Ni | 5 | 7.5 | 1.2 | 0.2 | 1.0 | 5.51 | 67 |
| 16* | Ni | 10 | 10 | 1.4 | 1.0 | 0.4 | 5.12 | 68 |
| 17* | Ni | 10 | 12.5 | 1.7 | 1.3 | 0.4 | 5.08 | 73 |
| 18* | Ni | 20 | 10 | 6.0 | 5.3 | 0.7 | 5.12 | 97 |
| 19* | Ni—Sn Alloy | 0 | 5 | 7.1 | 6.8 | 0.3 | 5.13 | 103 |

It is to be noted that the samples of sample numbers 14 to 19 marked with * in Table 2 are samples according to comparative examples, which fail to meet the requirements of the present invention, whereas the samples of sample numbers 11 to 13 marked with no * in Table 2 are samples according to examples, which meet the requirements of the present invention.

It is to be noted that the outside dimensions of the laminated ceramic capacitors obtained in Embodiment 2 are: width (W): 1.2 mm; length (L): 2.0 mm; and thickness (T): 1.1 mm as in the case of Embodiment 1, the ceramic dielectric layer interposed between the internal electrodes is 2.2 μm in thickness, and in addition, the total number of effective ceramic dielectric layers interposed between the internal electrodes is 300, and the area of the electrode opposed per layer is $1.6 \times 10^{-6}$ $m^2$.

<Evaluation of Characteristics>

For each of the laminated ceramic capacitors (samples of sample numbers 11 to 19 in Table 2) prepared in the way described above, electrostatic capacitance measurement, a high-temperature load test, etc. were carried out by the methods described below to examine characteristics.

(1) Measurement of Electrostatic Capacitance

First, from the prepared samples (laminated ceramic capacitors) of sample numbers 11 to 19 in Table 2, ten pieces of samples were taken for each sample number.

Next, an automatic bridge-type measurement instrument was used to measure the electrostatic capacitance under the condition of AC voltage: 1 Vrms at 1 kHz.

The results are shown together in Table 2.

(2) High-Temperature Load Test

The samples subjected to the electrostatic capacitance measurement were further subjected to a high-temperature load test under the condition of 7.5 V at 165° C., and a failure was determined at the time of an insulation resistance down to 10 KΩ or less. From this failure period, the MTTF (mean time to failure) was calculated.

The results are shown together in Table 2.

(3) Confirmation of Presence and Distribution of Sn in Internal Electrode

Furthermore, the fired ceramic laminated body obtained in the step (7) mentioned above for manufacturing the laminated ceramic capacitor was used to confirm the presence of Sn in the internal electrodes, the Sn alloyed with Ni, and the distribution of Sn in the internal electrodes by the method described below.

(3-1) Confirmation of Sn in Internal Electrode (a) Polishing

Each sample was held in such a posture as the length (L) direction in a vertical direction, the sample was encased in resin, and the WT surface defined by the width (W) and thickness (T) of the sample was exposed from the resin.

Then, the WT surfaces of the respective samples were polished by a polishing machine, and polished to a depth on the order of ½ in the length (L) directions of the respective samples. Then, in order to eliminate shear drop of the internal electrodes, which is caused by the polishing, the polished surfaces were processed by ion milling after the completion of the polishing.

(b) Mapping Analysis of Internal Electrode

Then, as in the case of Embodiment 1, as shown in FIG. 2, in a region of a WT cross section with the internal electrodes stacked, in a position on the order of ½ in the L direction, three regions of: a central region; and upper and lower regions closer to an outer layer section (ineffective section), that is, an upper region and a lower region were subjected to Ni and Sn mapping analyses by WDX (wavelength-dispersive X-ray spectroscopy).

As a result of the mapping analyses, it has been confirmed that there is Sn in the internal electrodes in the samples of sample numbers 11 to 13 which meet the requirements of the present invention, with the internal electrodes formed with the use of the conductive paste blended with the Sn constituent blended common material.

Further, it has been also confirmed, as a result of the mapping analyses, that there is Sn in the internal electrodes in each case of the samples of sample numbers 14 to 18 which fail to meet the requirements of the present invention, and the sample of sample number 19 which uses the conductive paste containing no common material blended with the Sn constituent ($SnO_2$).

(3-2) Confirmation of Form of Sn in Internal Electrode

The fired ceramic laminated body obtained in the step (7) described above for manufacturing the laminated ceramic capacitor was subjected to grinding into the form of a powder, and the obtained powder was analyzed by XRD (X-ray diffraction). As a result, the peak position of Ni was shifted, and thus, it has been confirmed that the Sn in the internal electrodes is present in the form of a Ni—Sn alloy.

(3-3) Confirmation of Distribution of Sn in Internal Electrode

As shown in FIG. 2, for each of three regions of: a central region; and upper and lower regions closer to an outer layer section (ineffective section), that is, an upper region and a lower region, in a region of a WT cross section with the internal electrodes stacked, in a position on the order of ½ in the L direction, analysis samples made into the form of a thin piece were prepared with the use of a microsampling method with FIB.

The samples made into the form of a thin piece were processed to be 60 nm or less in thickness. It is to be noted that a damaged layer of the sample surface, which was formed during the FIB processing, was removed by Ar ion milling.

SMI3050SE (from Seiko Instruments Inc.) was used for the FIB processing, and PIPS (from Gatan, Inc.) was used for the Ar ion milling.

The samples (thin-piece samples) prepared in the way described above were observed with a STEM (scanning transmission electron microscope), and four different internal electrodes were selected from the samples prepared for each of the regions. Then, five interfaces between the ceramic element and the internal electrode were searched which were substantially perpendicular to a cross section of the thin-piece sample.

Then, the internal electrode in contact with the substantially perpendicular interface was divided into a region at 2 nm from the interface into the internal electrode, and a region at 20 nm or more from the interface into the internal electrode.

It is to be noted that the interfaces substantially perpendicular to the cross section of the thin-piece sample were searched as follows. Lines appearing on both sides of each of the interfaces, that is, Fresnel fringes were observed with a STEM (scanning transmission electron microscope), and the interfaces were searched of which the contrasts of the Fresnel fringes were changed in a substantially symmetric fashion on the both sides when the focus was changed, and regarded as the interfaces substantially perpendicular to the cross section of the thin-piece sample.

In addition, JEM-2200FS (from JEOL Ltd.) was used as the scanning transmission electron microscope in the STEM analysis. The accelerating voltage is 200 kV.

For a detector, a SDD detector of JED-2300T with a caliber of 60 $mm^2$ was used, and for an EDX system, Noran System 7 (from Thermo Fisher Scientific K.K.) was used.

Then, for the region inside the internal electrode at 2 nm from the interface, and the region inside the internal electrode at 20 nm from the interface, quantitative analyses of Ni and Sn were performed with the use of EDX (energy dispersive X-ray analyzer) at 20 points of 5 points for each of the regions×4 electrodes in total. The measurement probe diameter of electron beam was adjusted to about 1 nm, and the measurement time was adjusted to 30 seconds. It is to be noted that Cliff-Lorimer correction was used for quantitative correction from EDX spectra obtained.

Figure 5:
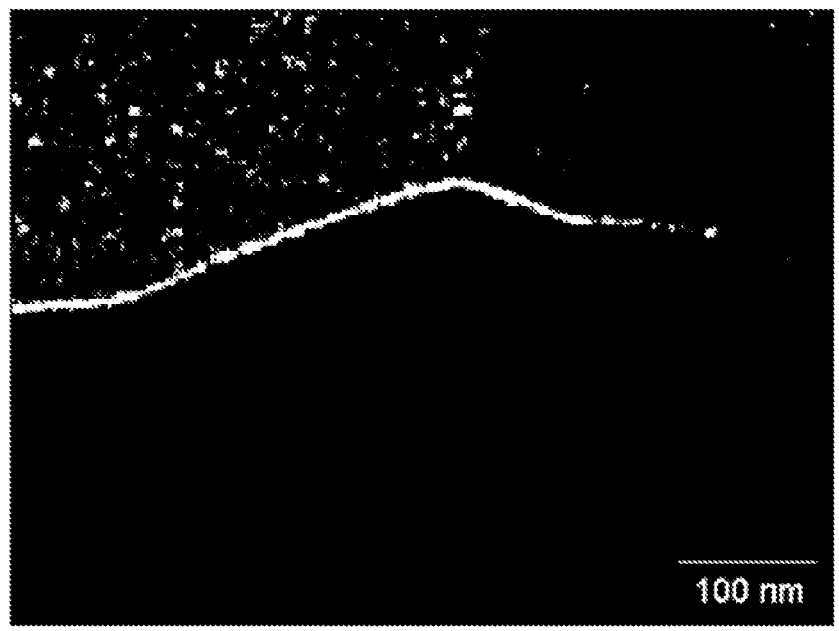
FIG. 5 is a diagram showing a STEM-EDX map of Sn near the interface between a ceramic dielectric layer and an internal layer constituting a laminated ceramic capacitor according to another embodiment of the present invention.

FIG. 5 shows a STEM-EDX map of Sn near the interface between the ceramic dielectric layer and the internal electrode. It is to be noted the mapping time was adjusted to 3 hours.

From FIG. 5, it is determined that there is more Sn near the interface between the ceramic dielectric layer and the internal electrode than in the internal part of the internal electrode.

Further, in regard to durability for each of the samples prepared in Embodiment 2 herein, as shown in Table 2, it has been confirmed that reliability is improved with large values of MTTF in the cases of the samples (laminated ceramic capacitors) of sample numbers 11 to 13 which meet the requirements of the present invention. This is believed to be because the condition of the interface between the ceramic and the electrode is changed due to the formation of a Ni—Sn alloy in the internal electrode.

In addition, in the cases of the samples (laminated ceramic capacitors) of sample numbers 11 to 13 which meet the requirements of the present invention, it has been confirmed that high electrostatic capacitance is achieved. This is believed to be because in the region at the depth of 2 nm from the interface between the internal electrode and the ceramic dielectric layer, the presence of Sn at higher concentration than in the region at the depth of 20 nm or more from the interface by 1.0 atomic % or more changes the distribution of residual stress within the laminated ceramic capacitor.

On the other hand, in the cases of the samples (samples of sample numbers 14 to 19) which fail to meet the requirements of the present invention, which were prepared in Embodiment 2, it has been confirmed that unfavorable results are obtained in regard to at least one of electrostatic capacitance and durability (MTTF).

It is to be noted that elements contained in the ceramic or internal electrodes, other than Ni and Sn, may be present at the interfaces between the ceramic dielectric layers and the internal electrodes in the laminated ceramic capacitor according to the present invention. In addition, different phases composed of elements other than Ni and Sn may be present partially at the interfaces between the ceramic dielectric layers and the internal electrodes.

Moreover, the common material for the internal electrodes may have the same composition as the ceramic material powder constituting the ceramic dielectric layers, from which some of the constituent elements may be excluded, some of the constituent element may be different, or the combination ratio may be different.

In addition, the ceramic material constituting the ceramic dielectric layers and the ceramic material constituting the common material desirably contain a perovskite-type oxide as their main constituent. While $BaTiO_3$ as a perovskite-type oxide was used as the ceramic materials in the embodiments described above, the Ba constituting $BaTiO_3$ may be partially substituted with Ca or Sr, or the Ti constituting $BaTiO_3$ may be partially substituted with Zr. Moreover, it is also possible to use other perovskite-type compounds such as $CaZrO_3$.

In addition, the proportion of Sn to the total amount of Sn and Ni in the region inside the internal electrode at 2 nm from the interface between the internal electrode and the ceramic dielectric layer is greater than 2 atomic %, and is desirably much higher for the improvement in high-temperature load life, without any particular upper limit. This is because the increased proportion of Sn is believed to increase the degree of variation in the condition (electrical barrier height) of the interface between the ceramic dielectric layer and the internal electrode. It is to be noted that the effect can be achieved, even when the proportion of Sn is, for example, 20 atomic % or more in the above-described region inside the internal electrode at 2 nm from the interface.

The present invention is not to be considered limited to the embodiments described above in other respects, but various applications and modifications can be made within the scope of the invention in regard to the numbers of the ceramic dielectric layers and internal electrodes constituting the ceramic laminated body, etc.

DESCRIPTION OF REFERENCE SYMBOLS 1 laminated ceramic capacitor
2 ceramic dielectric layer
3, 4 internal electrode
5 ceramic laminated body
6, 7 external electrode
L length
T thickness
W width

The invention claimed is:

1. A laminated ceramic capacitor comprising:
a ceramic laminated body having a plurality of stacked ceramic dielectric layers and a plurality of internal electrodes opposed to each other with the ceramic dielectric layers interposed therebetween; and
an external electrode on an outer surface of the ceramic laminated body and electrically connected to the internal electrodes,
wherein the internal electrodes contain Ni and Sn,
in a region of the internal electrode at a depth of 20 nm from a surface of the internal electrode opposed to the ceramic dielectric layer a proportion of a ratio of Sn to a total amount of Sn and Ni is 0.001 or more in molar ratio is 75% or more; and
in a central region in a thickness direction of the internal electrode a proportion of the ratio of Sn to the total amount of Sn and Ni is 0.001 or more in molar ratio is less than 40%.

* * * * *